May 9, 1933.   E. H. KNEEN   1,908,026
CONTAINER FOR STRIP PLASTER
Filed July 3, 1931
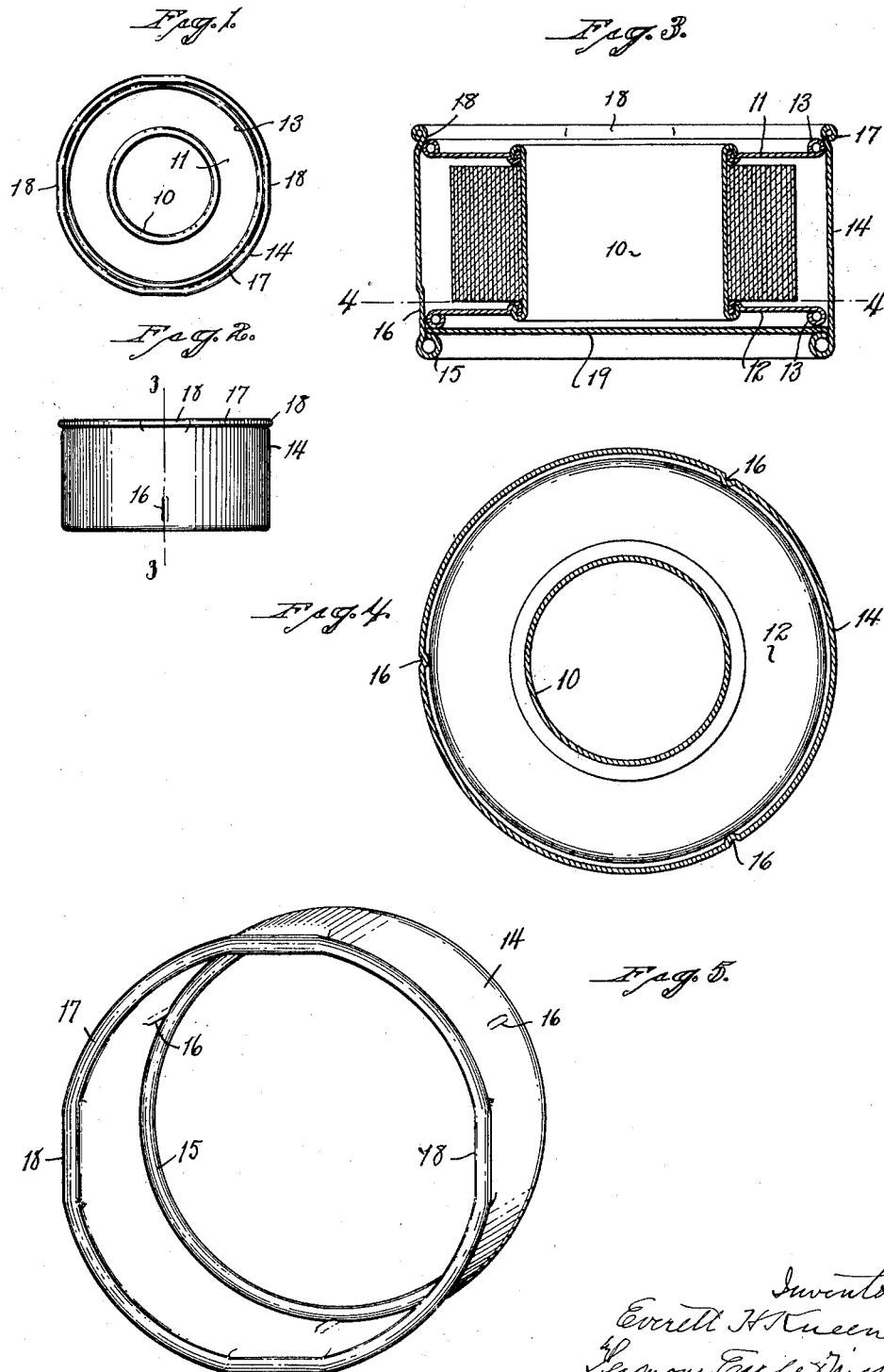

Patented May 9, 1933

1,908,026

UNITED STATES PATENT OFFICE

EVERETT H. KNEEN, OF ANSONIA, CONNECTICUT

CONTAINER FOR STRIP PLASTER

Application filed July 3, 1931. Serial No. 548,581.

This invention relates to an improvement in containers for strip plaster which comprise a spool and a ring or casing into which the spool may be inserted, and particularly to containers of this type in which the spool may be removed or entered from only one end of the ring, the object being to provide a simple structure for the purpose specified, and the invention consists in the construction as hereinafter described and particularly recited in the claim.

In the accompanying drawing:

Fig. 1 is a plan view of a container for strip plaster constructed in accordance with my invention;

Fig. 2 is a side view of the same;

Fig. 3 is a sectional view on the line 3—3 of Fig. 2 on an enlarged scale;

Fig. 4 is a sectional view on the line 4—4 of Fig. 3; and

Fig. 5 is a perspective view of the container-ring, detached.

In carrying out my invention, I employ a spool 10 of any approved construction and including ends 11 and 12 of uniform diameter and both formed with rolled edges 13. The ring 14 is slightly larger in diameter than the spool and one end is rolled to form an inwardly-extending rib 15, upon which the spool may rest and beyond which the spool cannot pass.

Just above the rib 15 the ring is formed with short vertically-arranged lugs 16 struck inward and forming bearings for the flange 12 to provide friction for holding the spool in place. To further lock the spool in position, the other end of the ring is rolled to form a rib 17, and this rib, at a plurality of points, is slightly flattened, forming stops 18, beyond which the spool passes as it is inserted into the ring and which adds further resistance to the withdrawal of the spool, so that when inserted the spool is firmly held in position but may be readily removed by pressure.

In some cases it is desirable to have one end of the ring closed and this may readily be accomplished by inserting a disk 19 into the ring so as to rest upon the rib 15, and this disk will be held in place by the lugs 16. At the same time, this disk is capable of movement, so that when pressure is applied to it, the spool may be ejected. For this purpose it is only necessary to move the spool sufficiently to cause the outer end to clear the outer end of the ring, and the lugs 16 will still retain the disk in position.

This construction can be produced at a low cost for manufacture and provides a container which firmly holds the spool in place and permits either end of the spool to be entered into the ring with but slight pressure.

I claim:

A container for strip plaster, comprising a spool provided with flanges of equal diameter, the edges of said flanges rolled, and a container-ring rolled inward at one end, forming a stop to arrest the passage of the spool through the ring, the said ring also formed near said stop with short inwardly-projecting vertical lugs with which one flange of the spool engages, the other end of the ring formed with a rib, and this rib formed with inwardly-set points beyond which the spool passes and which tend to hold the spool in the ring.

In testimony whereof, I have signed this specification.

EVERETT H. KNEEN.